United States Patent [19]

Boone

[11] 4,402,174

[45] Sep. 6, 1983

[54] SICKLE DRIVE WITH RESONANT SPRING ON THE NONDRIVEN END OF THE SICKLE

[75] Inventor: Jerry C. Boone, Independence, Mo.

[73] Assignee: Allis-Chalmers Corporation, Milwaukee, Wis.

[21] Appl. No.: 280,099

[22] Filed: Jul. 2, 1981

[51] Int. Cl.³ .................. A01D 55/02; F16H 23/00
[52] U.S. Cl. .............................. 56/306; 56/296; 56/257; 74/60; 188/378
[58] Field of Search .................. 56/306, 296, 257; 267/136, 137; 188/378

[56] References Cited

U.S. PATENT DOCUMENTS

| | | |
|---|---|---|
| 273,341 | 3/1883 | Blood . |
| 280,902 | 7/1883 | Blood .................... 56/306 |
| 2,109,085 | 2/1938 | Chilstrom . |
| 2,724,983 | 11/1955 | O'Conner ................ 188/378 |
| 3,112,652 | 12/1963 | Freeborn ................ 56/296 |
| 3,148,492 | 9/1964 | Naor ...................... 56/306 |
| 3,538,690 | 11/1970 | Hinks et al. . |
| 3,624,990 | 12/1971 | Sinder et al. . |
| 3,796,104 | 3/1974 | Templeton ............ 56/306 |
| 4,342,186 | 8/1982 | Stikeleather .......... 56/257 |
| 4,342,187 | 8/1982 | Shupert ................ 56/257 |

Primary Examiner—Gene Marcene
Assistant Examiner—John G. Weiss
Attorney, Agent, or Firm—Charles L. Schwab

[57] ABSTRACT

In order to provide a high cutting speed for a crop-cutting harvester (11), a torsion bar (101) is connected to the nondriven end of a crop-cutting sickle (28). The torsion bar (101) is connected to the sickle (28) by a lever (111 or 211) pivoting on the axis of the torsion bar. Counterweights (94, 131) may be added to adjust the resonant frequency, and hence, the resonant cutting speed. The use of a torsion bar on the nondriven end of the sickle, and none on the driven end, is believed to provide a high speed resonant sickle drive in which peak sickle forces are reduced.

1 Claim, 9 Drawing Figures

SICKLE DRIVE WITH RESONANT SPRING ON THE NONDRIVEN END OF THE SICKLE

FIELD OF INVENTION

This invention relates to crop-cutting harvester and more particularly, to an improved sickle drive with reduced stresses and torque peaks enabling operation at relatively high sickle speeds.

BACKGROUND OF THE INVENTION

There has been a trend over the past several years to provide argicultural combines of greater threshing capacity. While the size of combines has been increased over earlier designs, there appear to be practical limits to physical increases in size of the crop cutting header portion of the combines.

The productivity of large capacity combines may be increased by operating at a higher ground speed, which requires a higher cutter speed. In the case of a reciprocating sickle type cutter, the inertia related forces in the cutter mechanism increase with the square of the frequency of reciprocation. The present invention is directed to providing a cutting mechanism which operates at high speed without imposing unduly high forces on its drive mechanism. One concurrent development in this direction is the resonant cutting mechanism shown in a copending U.S. patent application Ser. No. 186,571 by Larry F. Stikeleather and Tony L. Kaminski filed Sept. 12, 1980 for Resonant Sickle Drive wherein a torsion bar is connected to the output lever of the wobble drive for the sickle. A second concurrent development aimed at somewhat high sickle operating speeds is the resonant sickle drive shown in copending U.S. patent application Ser. No. 220,502 by Paul T. Shupert filed Dec. 29, 1980 for Resonant Sickle Drive with Spring Means at Opposite Ends of the Sickle.

Prior art devices using resilient spring devices for cushioning or for storing and releasing energy during reciprocation of a cutting device include U.S. Pat. Nos. 273,341; 2,109,085; 3,538,690 and 3,624,990.

BRIEF DESCRIPTION OF THE INVENTION

A torsion bar of predetermined spring rate is connected to the nondriven end of a reciprocating sickle of a harvester. The torsion spring is especially selected or designed, so when used in conjunction with the sickle and its drive mechanism, the reciprocating and oscillating system so formed will be operating near a resonant frequency when the sickle is reciprocated at its normal crop cutting frequency. The torsion bar is preferably connected to the sickle by a lever pivotally connected to a support for oscillation about an oscillating axis transverse to the direction of operation of the sickle. Provision may be made for detachably connecting a counterweight to the end of the lever remote from its connections with the sickle. The selected counterweight mass may vary with the length of the sickle. In some applications the counterweight may be eliminated.

Preferably the torsion bar has zero stored energy at the midpoint of reciprocation of the sickle and stores energy as the sickle bar moves in either direction from midpoint to the end of its stroke. The torsion bar releases its energy to the sickle bar as the sickle bar moves from the end of its stroke to the midpoint of its stroke.

By selecting a proper length and diameter torsion spring, a natural frequency is obtained for the reciprocating sickle mechanism approximating the desired speed for reciprocating the sickle during a high speed cutting operation. The natural frequency operation reduces torque peaks and puts transverse forces into each end of the sickle resulting in more equal distribution of forces throughout the length of the sickle.

DETAILED DESCRIPTION OF THE DRAWINGS

Figure 6:
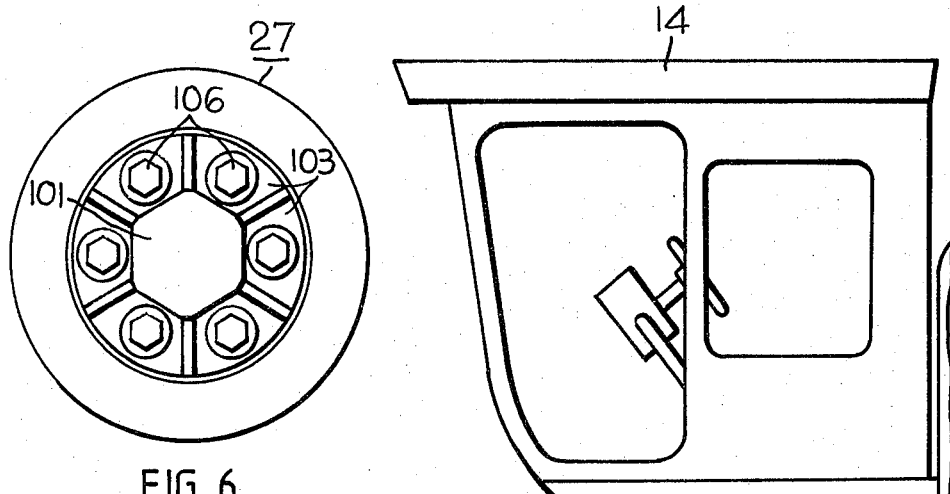
FIG. 6 is an enlarged view taken along the line VI—VI in FIG. 1.
Figure 1:
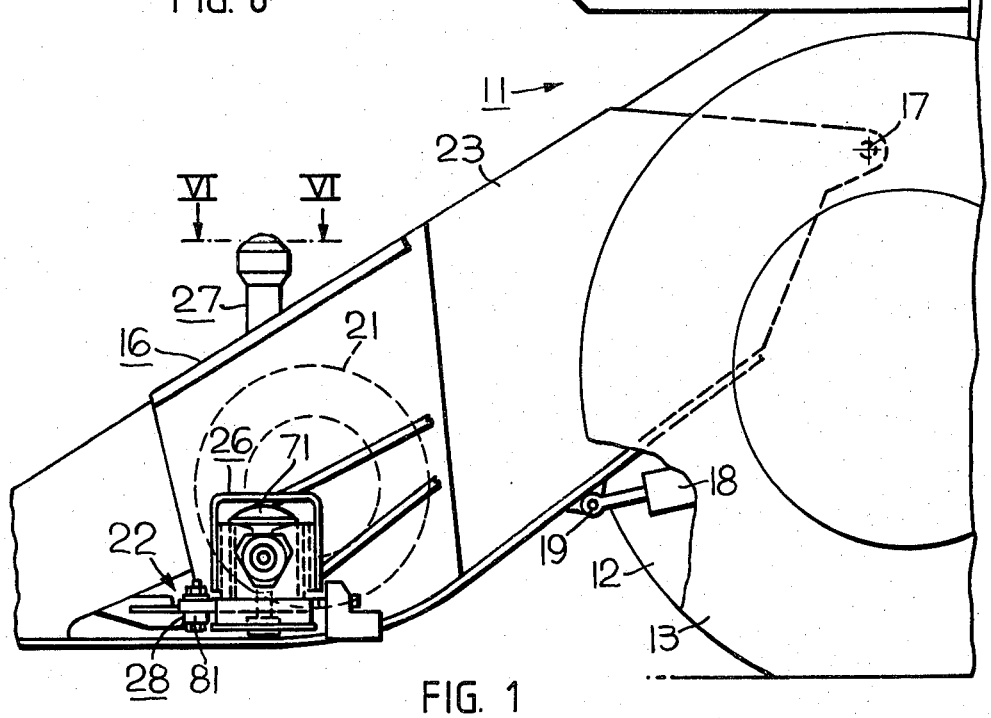
FIG. 1 is a side view of a harvester or combine.

Referring to FIG. 1, the combine 11, in which the present invention is incorporated, includes a pair of front wheels 12, 13, an operator's cab 14 and a header 16 pivotally connected to the main frame of the combine on a transverse pivot axis 17 for vertical swinging movement in response to expansion and contraction of a hydraulic jack 18 pivotally connected by a transverse pivot pin 19 to the bottom part of the header 16. The header 16 includes a transverse auger 21, which moves the material cut by a crop-cutting mechanism 22 laterally toward the central part of the header, where it is conveyed upwardly and rearwardly through a feeder portion 23 to the threshing section of the combine. The crop-cutting mechanism 22 includes drive means in the form of a wobble drive mechanism 26 at one lateral side of the header 16 and a torsion bar device 27 at the opposite side of the header 16. The wobble drive mechanism is drivingly connected to one end of a horizontally reciprocating sickle 28 of the cutting mechanism 22 and the torsion bar device 27 is connected to the opposite end of the sickle 28. When the belt pulley 71 is rotated the sickle 28 is reciprocated in the direction of its elongation.

Figure 2:
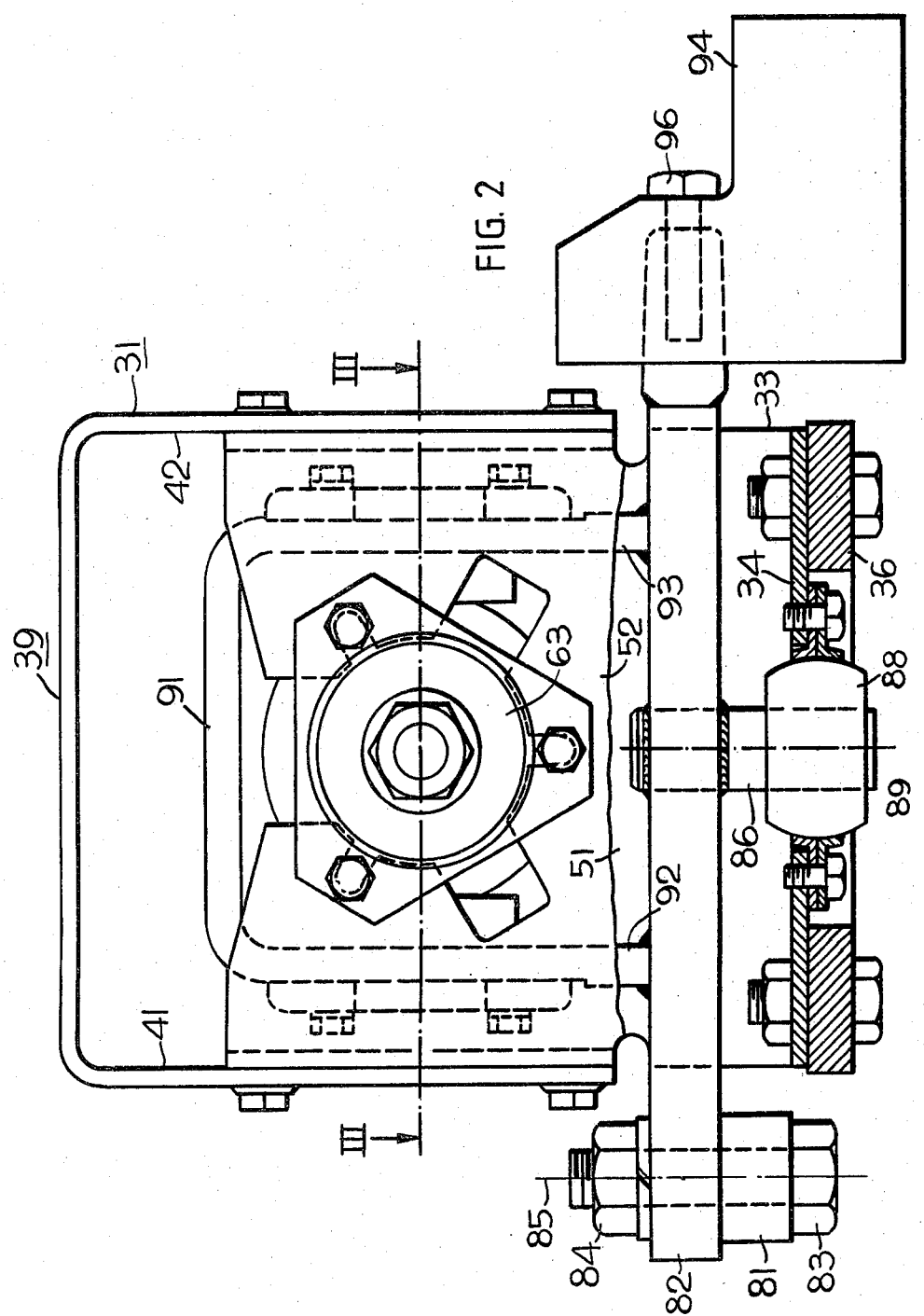
FIG. 2 is a side view of a wobble drive for the harvester sickle with parts broken away for illustration purposes.
Figure 3:
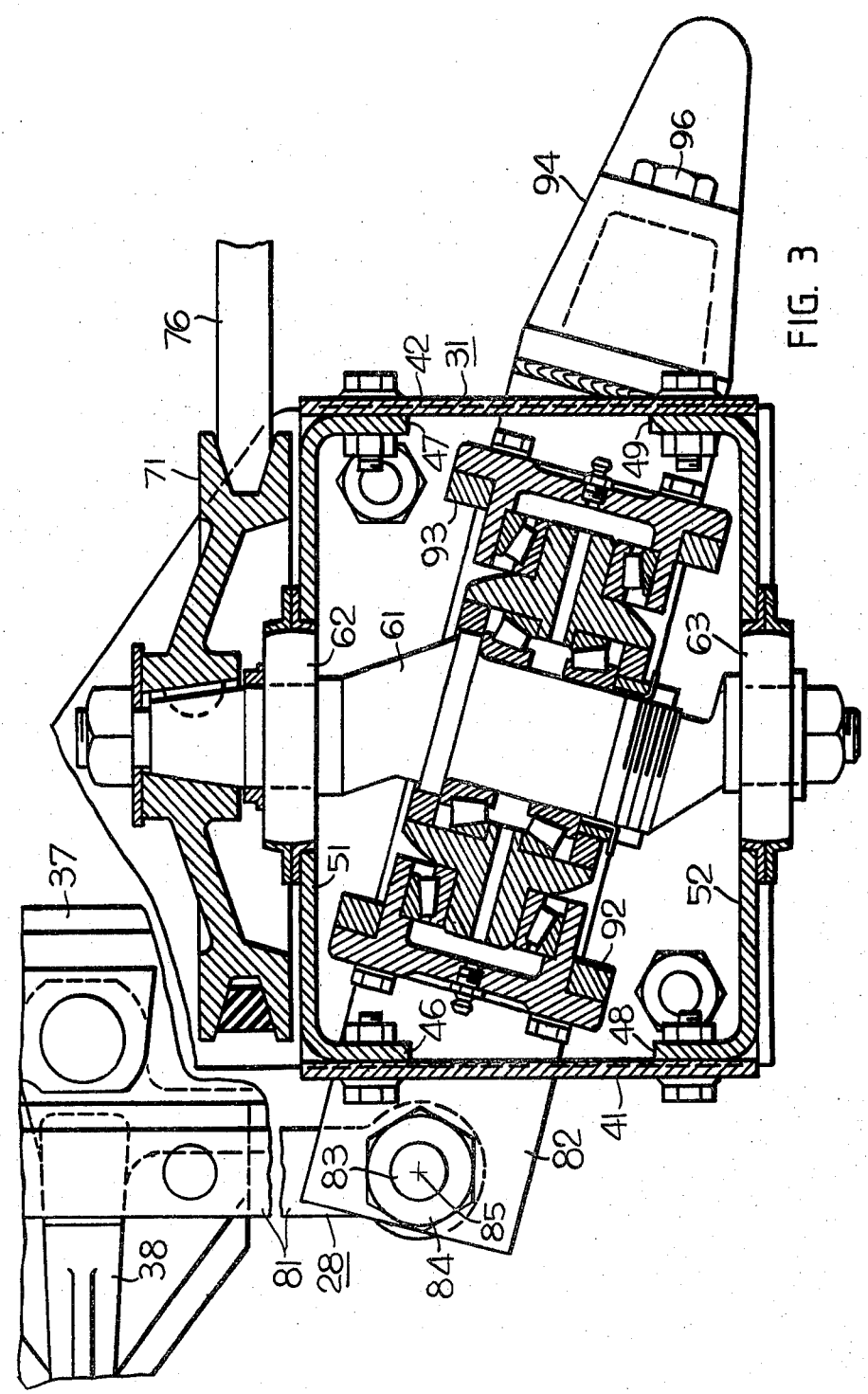
FIG. 3 is a view taken along line III—III in FIG. 2.

Referring also to FIGS. 2 and 3, a wobble drive support or housing 31 includes a lower portion 33 formed from a metal plate which has a flat bottom wall 34 bolted to a stationary frame member 36, to which the cutter bar 37 and sickle guards 38 are connected. The housing 31 also includes an upper portion 39 formed from a metal plate having downwardly extending sides 41, 42 bolted to flanges 46, 47, 48, 49 of the upright sidewalls 51, 52 of the lower portion 33.

As shown in FIG. 3, a crankshaft 61 has its opposite ends mounted in bearings 62 and 63 supported on the sidewalls 51 and 52. A V-belt pulley 71 is secured to the laterally inner end of the crankshaft 61 and is driven by the combine engine (not shown) through a suitable drive train including a V-belt 76. A reciprocating sickle bar 81 of the sickle 28 is pivotally connected to an oscillating drive lever 82 by a suitable pivot bolt 83 and nut 84. An upright or vertical pivot pin 86 is welded to an intermediate portion of the lever 82. The lower end of the pin 86 is journalled in a bearing 88 supported on the stationary lower housing wall 34 for pivotal movement about a vertical pivot axis 89. An upright, inverted, U-shaped part 91 of the horizontally extending lever 82 has its downwardly extending vertical walls or legs 92 and 93 welded to the lever 82 at diametrically opposite sides of the upright pivot pin 86. The sickle drive is counterbalanced by a counterweight 94 releasably secured by a cap screw 96 to the free end of the lever 82 remote from its connection to the sickle bar 81. The oscillating operating lever 82 is pivotally connected on an axis 85 in driving relation to the sickle bar 81 by the pivot bolt 83 and nut 84.

Figures 4, 5:
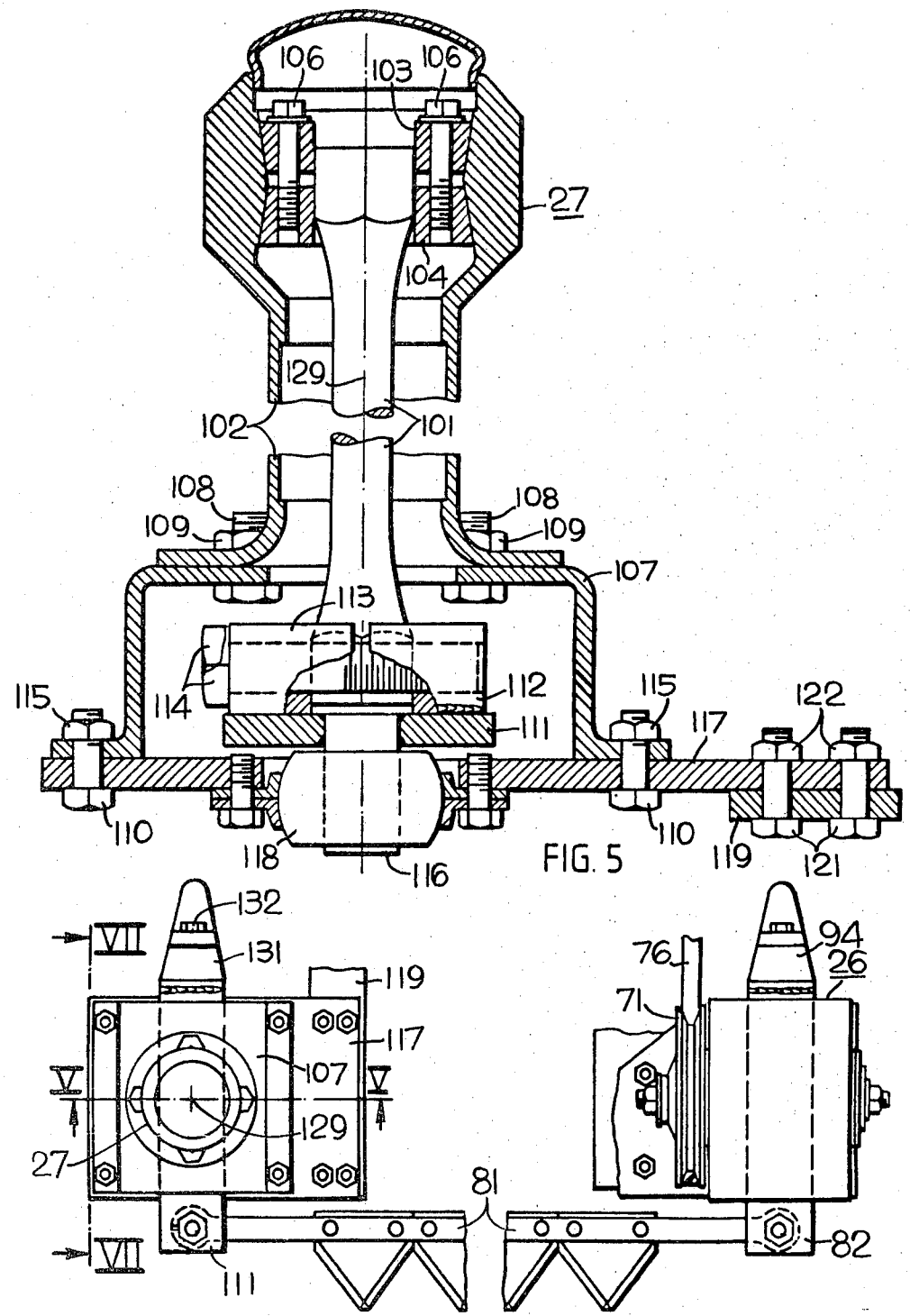
FIG. 4 is a partial top view of the harvester showing the wobble drive at one end of the sickle and a torsion bar at the nondriven end of the sickle.
FIG. 5 is a view taken along the line V—V in FIG. 4.

As shown in FIG. 5, the torsion bar device 27 includes an upright torsion bar 101 which has its upper end rigidly secured to the upper end of a stationary mounting tube 102 by releasable fastening means in the form of two series of tapered clamping segments 103, 104 secured together by cap screws 106. The lower end of the tube 102 is secured to a bracket 107 by bolts 108 and nuts 109 and the bracket 107 is secured to a support member 117 by bolts 110 and nuts 115. The hex-shaped lower end of the torsion bar 101 is rigidly secured to a lever 111 by a split clamp having a fixed part 112 welded to the lever 111 and a removable part 113 releasably secured to the fixed part 112 by a pair of cap screws 114. The lever 111 includes a pin 116 welded thereto which is pivotally supported on the stationary support member 117 by a spherical bearing 118. The support member 117 is rigidly fastened to a header frame member 119 by bolts 121 and nuts 122. The support member 117, the cutter bar 37 and the housing 31 are rigidly interconnected to constitute a support for the sickle bar 28 and for the motion imparting devices in the form of the wobble drive mechanism 26 and the torsion bar device 27.

Figure 7:
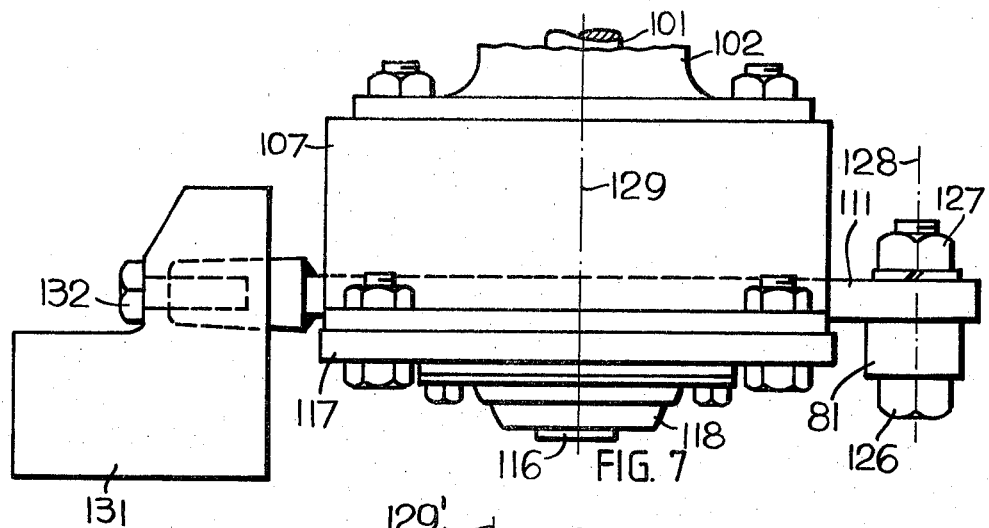
FIG. 7 is a view taken along the line VII—VII in FIG. 4.

Referring also to FIG. 7, the nondriven end of the sickle bar 81 is pivotally connected to the front end of the lever 111 by a suitable pivot bolt 126 and nut 127 for pivotal movement about an upright axis 128 which is parallel to the axis 129 common to the torsion bar 101 and pivot pin 116. In some applications of the invention it may be desirable to use a counterweight 131 releasably secured by a cap screw 132 to the free end of the lever 111 remote from its end connected to the sickle bar 81. Thus, in the embodiment of the invention shown in FIG. 4, the wobble drive output lever 82 and the torsion bar lever 111 are both counterweighted and move in a sychronized oscillation.

Figure 8:
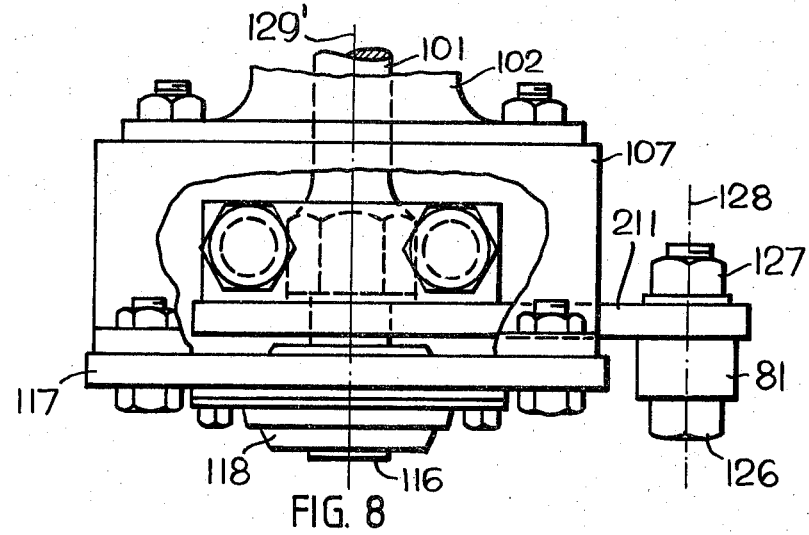
FIG. 8 is a side view of the nondriven end of the sickle illustrating an embodiment of the present invention in which the counterweight is eliminated from the torsion bar lever.
Figure 9:
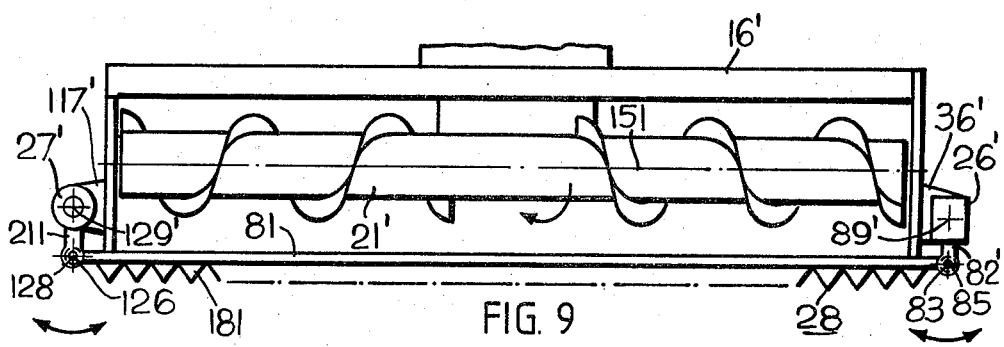
FIG. 9 is a partial top view of a harvester illustrating an embodiment of the present invention in which the counterweights are eliminated from both ends of the sickle.

In some crop-cutting applications, satisfactory high speed operation is obtained without use of counterweights. Such a construction is shown in FIGS. 8 and 9. The structure of FIG. 8 is the same as that shown in FIGS. 5 and 7 except a different lever 211 is provided in place of lever 111. It will be noted levers 211 and 82' do not carry counterweights. As shown in FIG. 9, the sickle 28 is transversely reciprocated by the lever 82' of the wobble drive 26' and during such reciprocation, energy is stored and released from the torsion bar device 27' connected to the opposite lateral end of the sickle 28 by lever 211.

In FIG. 9, the wobble drive 26 and torsion bar device 27' are mounted on brackets 36', 117' fixedly secured to the header 16' in which the usual transverse auger 21' is disposed for rotation about a transverse horizontal axis 151. The sickle 28 with its sickle bar 81 mounting the usual sickle knives 181 is disposed at the front of the header so as to sever the crop being harvested. As shown in the embodiment of FIG. 9, the generally vertical axis 89' about which the wobble drive lever 82' pivots relative to the header is parallel with the generally vertical pivot axis 129' of the torsion bar lever 211. Also, the axis 85 of the pivot bolt 83 connecting lever 82' to the sickle 28 is parallel with the generally vertical axis 128 of the pivot bolt 126. The axes 89', 129', 128 and 85 are parallel to one another and transverse to the horizontal direction of reciprocation of the sickle 28.

OPERATION

Providing a torsion bar connected to the nondriven end of the sickle 28 is believed to favorably affect force distribution in the sickle bar during operation at or near resonant speed. Also, when operating a sickle with the present invention at or near resonant cutting speed, the peak-to-peak forces at the driven end of the sickle due to inertia are drastically reduced as compared to a conventional sickle with conventional reciprocating drive.

The selection of counterweights, or elimination thereof entirely, will depend on desired operating speed and the cutting forces expected in cutting the crop. Different crops have different resistances to cutting. The interia of various components in the reciprocating sickle system also affects the choice of counterweight and torsion bar. The crop-cutting mechanism utilizing this invention provides a resonant frequency which falls within a predetermined high speed range of operating frequencies of reciprocation of the cutting sickle during a crop cutting operation. The use of a torsion bar on the nondriven end of the sickle as herein suggested is expected to provide near zero stress in the sickle bar at its central portion thus reducing peak torques. The reduction in forces through use of the present invention is expected to permit high cutting speeds with reasonably low vibration levels and acceptable service life of components.

The embodiments of the invention in which an exclusive property or privilege is claimed are defined as follows:

1. A crop-cutting device for a harvester comprising:
    a support,
    an elongated sickle horizontally reciprocable in its direction of elongation,
    power drive means connected only to one end of said sickle for reciprocating the latter, said drive means being the only motion imparting means connected to said one end of said sickle and said one end of said sickle being free of any direct relationship with an energy storing and releasing mechanism,
    a lever having one end pivotally connected to the other end of said sickle and extending in a transverse direction from the latter,
    means pivotally connecting a portion of said lever at a point thereof spaced from said one end of said lever to said support for oscillating movement of said lever about an oscillation axis spaced from said sickle during reciprocation of the latter,
    a torsion bar of rod-like configuration and means nonrotatably and rigidly securing opposite ends of said torsion bar to said support and lever, respectively, the resonant frequency of said sickle and oscillating elements connected thereto falling within a predetermined high speed range of operating frequencies of reciprocation of said sickle during a crop-cutting operation, said torsion bar cyclically receiving energy from and imparting energy to said sickle during reciprocation of the latter by said power drive means.

* * * * *